3,085,830
WHEEL TRIM
George Albert Lyon, Detroit, Mich., assignor to Lyon Incorporated, Detroit, Mich., a corporation of Delaware
Filed Mar. 23, 1961, Ser. No. 97,965
4 Claims. (Cl. 301—37)

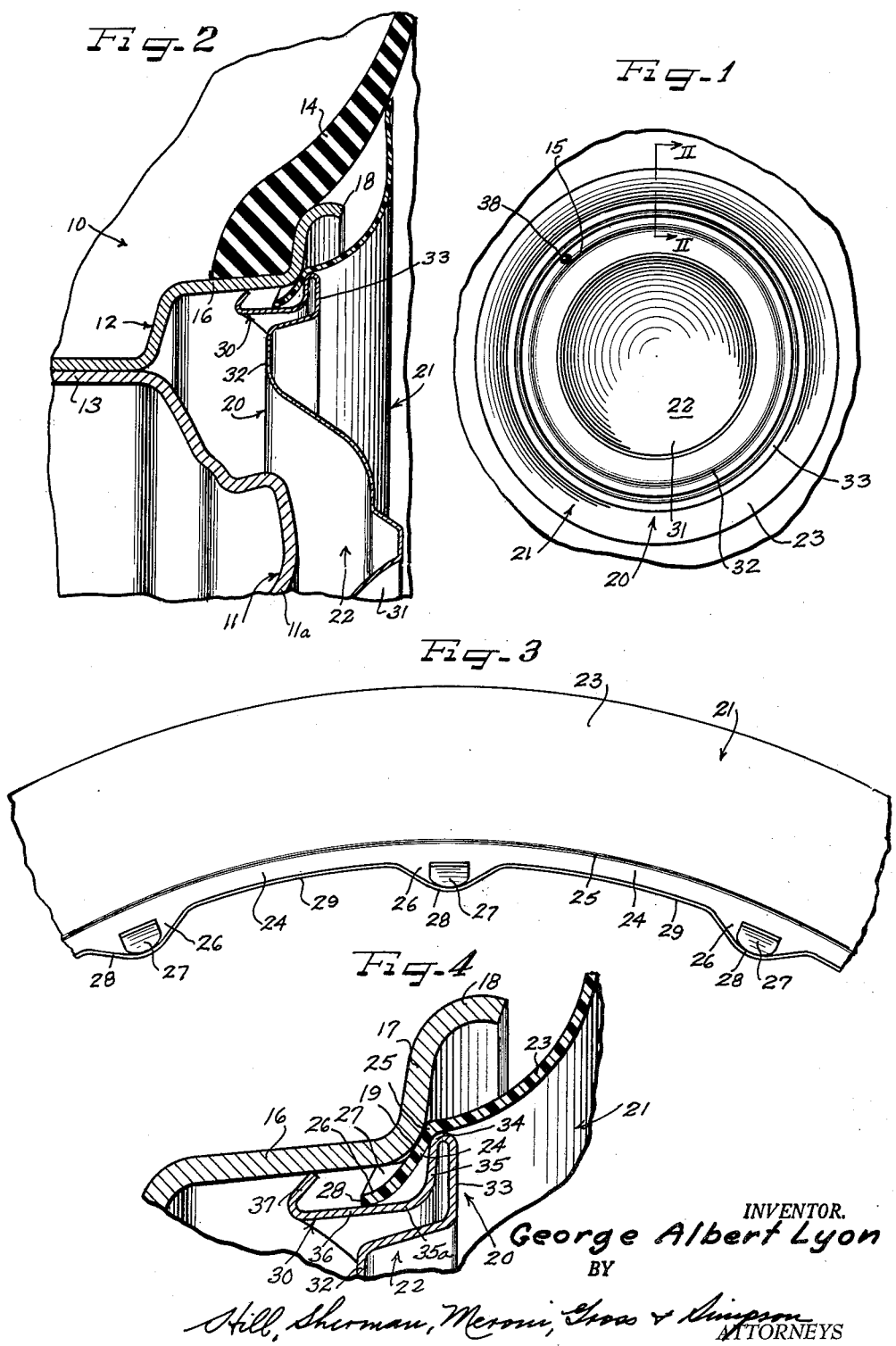

The present invention relates generally to a wheel structure and more particularly to a cover structure for retained disposition upon the outer side of the vehicle wheel.

The present applicaton is a continuation in part of my application Serial No. 11,018, filed February 25, 1960.

In the automobile industry at the present time, there has been a great demand for cover structures which are highly distinctive and unique in construction and design. One area of interest has been in a multi-part cover structure including a metallic cover member and a synthetic ring member, the ring member being colored differently than the cover member to provide a contrasting color appearance. As an example, the cover member may be made from stainless steel and the trim member may be made from a synthetic material such as polyethylene and which trim member may be substantially black in color with a violet or gold strip along its outer margin.

According to the present invention, the trim member is provided with an inner margin for engagement on an annular tire rim shoulder and the inner trim margin is further provided with extensions extending radially inwardly of the annular rim shoulder. Each of the extensions, according to the present invention, is provided with an integral generally V-shaped bump which bump is related with respect to the extension in such a way that it is adapted to bottom against the axial rim flange disposed radially inwardly of the aforesaid annular rim shoulder. The cover is provided with underturned cover retaining extensions and they serve to maintain the trim member as well as the cover member in assembly on the wheel. When the trim member is retainingly bottomed against the annular rim shoulder the trim bumps serve to provide anti-pull-out means to absolutely prevent the trim member from moving radially outwardly of the shoulder.

An important object of the present invention is to provide a new and improved cover structure including a trim member having anti-pull-out means to prevent the trim member from being unseated from its intended position.

Yet another object of the present invention is to provide a cover structure which sustains itself upon a vehicle wheel in a new and improved manner.

Still a further object of the present invention is to provide a trim member having anti-pull-out means which trim member may be economically manufactured on a large production scale.

Other objects and features of the present invention will more fully become apparent in view of the following detailed description taken in conjunction with the accompanying drawings illustrating a single embodiment, and in which:

FIGURE 1 is a side elevation of my wheel structure.
FIGURE 2 is an enlarged cross-section taken substantially on the line II—II in FIGURE 1 looking in the direction indicated by the arrows;
FIGURE 3 is a rear elevation of a trim member; and
FIGURE 4 is a cross-section similar to FIGURE 2 only which is further enlarged.

As shown on the drawings:
The reference numeral 10 indicates generally a wheel structure. In FIGURE 2, the wheel structure is shown as including a body part 11 and a multi-flanged drop center type of tire rim 12 which is secured with the body part at 13. In order to mount the body part and the rim on a vehicle wheel, the body part is provided with a bolt-on flange 11a. Suitable threaded lugs may be telescoped through holes in the bolt-on flange 11a and secured to a vehicle wheel axle (not shown) to clamp the body part to the wheel axle.

The wheel structure 10 further includes a pneumatic tire 14 which may be either of the tube or tubeless type and which has a valve 15 for inflating the same. The tire 14 is illustrated as being mounted on the tire rim.

The tire rim further includes a series of step-type flanges including an intermediate rim flange 16, a radial rim flange 17, and a terminal rim flange 18. Disposed at the juncture of the intermediate axial rim flange 16 and the radial rim flange 17 is an annular rim shoulder 19.

The drawings illustrate a cover structure 20 as being mounted on the wheel. The cover structure includes a synthetic trim member 21 which may be comprised of any suitable material such as nylon and the like. The cover structure 20 further includes a cover member 22 which may be also comprised of any suitable material such as stainless steel and the like.

The trim member has an annular arcuate trim portion 23 as well as a radially inwardly offset inner trim margin 24 at its inner end. A seat 25 is disposed inwardly of the juncture between the annular arcuate trim portion 23 and the inwardly offset inner trim margin 24. When the trim member 21 is mounted on a vehicle wheel, it will be noted the inner trim margin 24 is seated on the annular rim shoulder 19.

The inner trim margin 24 is provided with circumferentially spaced offset trim extensions or finger tabs 26 and each of the extensions has anti-pull-out means comprising an integral trim bump or interlock bump protrusion shoulder boss 27. The V-shaped bump has converging angularly related surfaces with one surface extending generally axially for engagement with the intermediate rim flange and with the other surface extending generally radially and axially outwardly and being disposed radially inwardly of the axial surface. It will be seen from the drawings that the inner trim margin as well as the trim extensions 26 are arcuate and have inner and outer surfaces which are smoothly blended in common arcs. In essence, the trim member then comprises a ring having two arcuate portions including the annular arcuate trim portion 23 as one arcuate portion and the inner trim margin 24 and the trim extensions 26 as the other arcuate portion.

Each of the trim extensions 26 has a rounded radially inner extension edge 28 with opposite ends of the extension edge 28 being merged and joined with an innermost marginal edge 29 of the inner trim margin 24.

When the trim member 21 is mounted on the wheel, its inner marginal trim edge 29 is so disposed with respect to the trim member 21 and the annular rim shoulder 19 so as to axially confront the annular trim shoulder. By this construction, the circumferentially spaced trim extensions 26 are then free to extend radially and axially inwardly of the rim shoulder 19 permitting the trim bumps 27 to engage the axial rim flange 16. This relationship is important so as to permit cover retaining extensions 30 on the cover member 22 to extend axially across the inner marginal trim edge 29 and circumferentially between the trim bumps 27 into retained engagement with the axial rim flange 16.

The cover member 22 is of a dished type and includes a central crown 31 as well as a dished cover portion 32 and an outer cover margin 33. The outer cover margin is provided with an annular seating cover portion 34 at the juncture between the cover margin 33 and a radially extending annular cover flange 35. This annular seating cover portion 34 is adapted to be engaged in the trim seat 25 when the trim member and the cover member are mounted in assembly on the vehicle wheel.

It will be noted the cover retaining extensions 30 are of the return bent type and project axially inwardly of an annular axially extending marginal cover flange 35a and are joined at axially outer ends with the cover flange 35a, the flange 35a being disposed at the radially inner end of the flange 35. Each of the extensions 30 includes an axial resiliently deflectable cover extension leg 36 as well as a return bent short stiff terminal cover extension leg 37. The leg 37 has a terminal cover extension edge adapted for edgewise engagement with the intermediate rim flange 16. Since the extensions 30 are arranged in a common circle or obit having a diameter slightly in excess of the diameter of the intermediate rim flange 16, the cover may be engaged under resilient tension when mounted on the wheel since the extensions 30 are deflected radially inwardly slightly out of normal position. When the cover structure is mounted on the wheel, it will be noted the trim extensions 26 are supported on the resilient axial legs 36 and that these resilient axial legs exert a spring force against the trim extensions 26 to hold the trim bumps 27 bottomed against the rim flange 16.

The cover structure may be mounted on the wheel by initially centering and bottoming the trim member 21 against the annular rim shoulder 19. The cover valve stem opening 38 is then aligned with the valve stem 15 and the cover retaining extensions 30 are axially aligned with the trim extensions 26 whereupon an axial force is applied against the cover member 22 to cause the cover member to be moved axially inwardly into cover retaining engagement with the wheel. The retaining action between the cover member and the axial rim flange 16 serves to also maintain the trim member 21 in assembly on the wheel. When the cover member and the trim member are in assembly on the wheel, the outer cover margin 33 is engaged in the trim seat 25 and the extensions 30 coact with the axial rim flange 16 while at the same time securing the trim bumps 27 against rim flange 16 to prevent the trim member from being disassembled from the wheel and to prevent radially outward movement of the trim member relative to the annular rim shoulder 19.

An alternative way to assemble the trim member 21 and the cover member 22 on the wheel is to assemble the trim member 21 and the cover member 22 together before applying them to the wheel. This result may be obtained by biasing the trim extensions 26 over the return bent terminal 37 so that the trim extensions are secured in the cover pocket defined by the cover flanges 35 and 35a and the extension legs 36 and 37. The trim member 21 may be pulled apart from the cover member 22 merely by moving the extension over the return bent terminal 27.

The cover structure 20 may be removed from the wheel by inserting a suitable pry-off tool underneath the outer cover margin so as to release the cover retaining extensions 30 whereupon the trim member 21 and the cover member 22 may be removed from the wheel.

It will be understood that modifications and variations may be effected without departing from the scope of the novel concepts of the present invention.

I claim as my invention:

1. In a wheel structure including a tire rim having an intermediate flange and a terminal flange joined thereto on a shoulder, a circular metallic cover member having a marginal portion thrusting toward said shoulder and having extending from said marginal portion generally axially inwardly projecting cover retaining flange means disposed in spaced telescoped relation to the intermediate flange adjacent to said shoulder and provided with retaining means engaging said intermediate flange to retain the cover member in place, a tire side wall simulating ring member of sheetlike synthetic plastic material having a radially outer margin projecting substantially beyond the terminal flange and opposing the tire side wall and a radially inner marginal portion engaging said shoulder and clamped thereagainst by said marginal portion of the cover member, said inner marginal portion of the ring member having projecting generally radially inwardly thereon a circumferential series of resiliently flexible centering and retaining finger tabs engageable at their tips under resilient tension against said retaining flange structure of the cover member, said finger tabs having on the axially inner sides thereof interlock bump protrusion shoulder bosses substantially increasing the overall thickness in the respective boss areas of the finger tabs and opposing the rim shoulder and serving as anchors to resist pull-out forces tending to withdraw the finger tabs from the clamping retention afforded by the cover margin and the tire rim shoulder.

2. In a wheel structure including a tire rim having an intermediate flange and a terminal flange joined thereto on a shoulder, a circular metallic cover member having a marginal portion thrusting toward said shoulder and having extending from said marginal portion generally axially inwardly projecting cover retaining flange means disposed in spaced telescoped relation to the intermediate flange adjacent to said shoulder and provided with retaining means engaging said intermediate flange to retain the cover member in place, a tire side wall simulating ring member of sheetlike synthetic plastic material having a radially outer margin projecting substantially beyond the terminal flange and opposing the tire side wall and a radially inner marginal portion engaging said shoulder and clamped thereagainst by said marginal portion of the cover member, said inner marginal portion of the ring member having projecting generally radially inwardly thereon a circumferential series of resiliently flexible centering and retaining finger tabs engageable at their tips under resilient tension against said retaining flange structure of the cover member, said finger tabs having on the axially inner sides thereof interlock bump protrusion shoulder bosses substantially increasing the overall thickness in the respective boss areas of the finger tabs and opposing the rim shoulder and serving as anchors to resist pull-out forces tending to withdraw the finger tabs from the clamping retention afforded by the cover margin and the tire rim shoulder, said bosses each having converging angularly related surfaces with one surface extending generally axially for engagement with the intermediate flange and with the other surface extending generally radially and axially outwardly and being disposed radially inwardly of the axial surface for assisting in centering the ring member with respect to said shoulder.

3. In a wheel structure including a tire rim having an intermediate flange and a terminal flange joined thereto on a shoulder, a circular metallic cover member having a marginal portion thrusting toward said shoulder and having extending from said marginal portion generally axially inwardly projecting cover retaining flange means disposed in spaced telescoped relation to the intermediate flange adjacent to said shoulder and provided with retaining means engaging said intermediate flange to retain the cover member in place, a tire side wall simulating ring member of sheetlike synthetic plastic material having a radially outer margin projecting substantially beyond the terminal flange and opposing the tire side wall and a radially inner marginal portion engaging said shoulder and clamped thereagainst by said marginal portion of the cover member, said inner marginal portion of the ring member having projecting generally radially inwardly thereon a circumferential series of resiliently flexible centering and retaining finger tabs engageable at their tips under resilient tension against said retaining flange structure of the cover member, said finger tabs having on the axially inner sides thereof interlock bump protrusion shoulder bosses substantially increasing the overall thickness in the respective boss areas of the finger tabs and opposing the rim shoulder and serving as anchors to resist pull-out forces tending to withdraw the finger tabs from the clamping retention afforded by the cover margin and the tire rim shoulder, said cover retaining means including a series of resiliently deflectable annularly arranged cover retaining fingers and with axial flanges of the fingers engaged against the bosses and holding the bosses under resilient pressure in bottomed engagement against the intermediate flange.

4. In a wheel structure including a tire rim having an intermediate flange and a terminal flange joined thereto on a shoulder, a circular metallic cover member having a marginal portion thrusting toward said shoulder and having extending from said marginal portion generally axially inwardly projecting cover retaining flange means disposed in spaced telescoped relation to the intermediate flange adjacent to said shoulder and provided with retaining means engaging said intermediate flange to retain the cover member in place, a tire side wall simulating ring member of sheetlike synthetic plastic material having a radially outer margin projecting substantially beyond the terminal flange and opposing the tire side wall and a radially inner marginal portion engaging said shoulder and clamped thereagainst by said marginal portion of the cover member, said inner marginal portion of the ring member having projecting generally radially inwardly thereon a circumferential series of resiliently flexible centering and retaining finger tabs engageable at their tips under resilient tension against said retaining flange structure of the cover member, said finger tabs having on the axially inner sides thereof interlock bump protrusion shoulder bosses substantially increasing the overall thickness in the respective boss areas of the finger tabs and opposing the rim shoulder and serving as anchors to resist pull-out forces tending to withdraw the finger tabs from the clamping retention afforded by the cover margin and the tire rim shoulder, the radially inner marginal portion being disposed in one arc with the bosses at its innermost end and the radially outer margin being disposed in another arc and with said ring member having an annular seat at the juncture of said arcs, the marginal portion of said cover being engaged against said seat holding it bottomed against the tire rim.

References Cited in the file of this patent
UNITED STATES PATENTS

| | | |
|---|---|---|
| D. 187,263 | Aske et al. | Feb. 23, 1960 |
| 2,426,109 | Lyon | Aug. 19, 1947 |
| 2,862,769 | Wood | Dec. 2, 1958 |
| 2,926,957 | Lyon | Mar. 1, 1960 |
| 2,963,325 | Aske et al. | Dec. 6, 1960 |
| 2,964,357 | Barnes | Dec. 13, 1960 |
| 2,996,336 | Wood | Aug. 15, 1961 |
| 3,026,147 | Lauve | Mar. 20, 1962 |